(12) United States Patent
Wohlhart et al.

(10) Patent No.: US 11,314,987 B2
(45) Date of Patent: Apr. 26, 2022

(54) DOMAIN ADAPTATION USING SIMULATION TO SIMULATION TRANSFER

(71) Applicant: X Development LLC, Mountain View, CA (US)

(72) Inventors: Paul Wohlhart, Sunnyvale, CA (US); Stephen James, Santa Clara, CA (US); Mrinal Kalakrishnan, Palo Alto, CA (US); Konstantinos Bousmalis, London (GB)

(73) Assignee: X Development LLC, Mountain View, CA (US)

( * ) Notice: Subject to any disclaimer, the term of this patent is extended or adjusted under 35 U.S.C. 154(b) by 226 days.

(21) Appl. No.: 16/692,509

(22) Filed: Nov. 22, 2019

(65) Prior Publication Data

US 2020/0167606 A1 May 28, 2020

(30) Foreign Application Priority Data

Nov. 23, 2018 (GR) .............................. 20180100527

(51) Int. Cl.
| | |
|---|---|
| *G06K 9/00* | (2006.01) |
| *G06K 9/62* | (2022.01) |
| *G06N 3/08* | (2006.01) |
| *G06N 3/04* | (2006.01) |
| *G05B 13/02* | (2006.01) |
| *G06T 7/50* | (2017.01) |
| *B25J 9/16* | (2006.01) |

(52) U.S. Cl.
CPC ............ *G06K 9/6257* (2013.01); *B25J 9/163* (2013.01); *B25J 9/1671* (2013.01); *B25J 9/1697* (2013.01); *G05B 13/027* (2013.01); *G06K 9/628* (2013.01); *G06K 9/6262* (2013.01); *G06N 3/0454* (2013.01); *G06N 3/08* (2013.01); *G06T 7/50* (2017.01); *G06T 2207/20081* (2013.01); *G06T 2207/20084* (2013.01)

(58) Field of Classification Search
CPC .... G06K 9/6257; G06K 9/6262; G06K 9/628; G06K 9/00664; G06K 9/6271; B25J 9/163; B25J 9/1671; B25J 9/1697; B25J 9/161; G05B 13/027; G05B 2219/40532; G06N 3/0454; G06N 3/08; G06N 3/008; G06N 3/0472; G06T 7/50; G06T 2207/20081; G06T 2207/20084

See application file for complete search history.

(56) References Cited

U.S. PATENT DOCUMENTS

| | | | |
|---|---|---|---|
| 2020/0070352 A1* | 3/2020 | Larzaro-Gredilla | ........................ G06K 9/6297 |
| 2020/0122321 A1* | 4/2020 | Khansari Zadeh | .... B25J 9/1697 |
| 2020/0174490 A1* | 6/2020 | Ogale | .................. G05D 1/0221 |

OTHER PUBLICATIONS

Antonova et al., "Reinforcement Learning for Pivoting Task," https://arxiv.org/abs/1703.00472, Mar. 2017, 7 pages.
Bohg et al., "Data-Driven Grasp Synthesis—A Survey," IEEE Transactions on Robotics, Apr. 2014, 30(2):289-309.

(Continued)

*Primary Examiner* — Ping Y Hsieh
(74) *Attorney, Agent, or Firm* — McDonnell Boehnen Hulbert & Berghoff LLP (57) ABSTRACT

Methods, systems, and apparatus, including computer programs encoded on computer storage media, for training a generator neural network to adapt input images.

20 Claims, 3 Drawing Sheets

(56) References Cited

OTHER PUBLICATIONS

Bousmalis et al., "Domain Separation Networks," Advances in Neural Information Processing Systems, Dec. 2016, 9 pages.
Bousmalis et al., "Unsupervised Pixel-Level Domain Adaptation with Generative Adversarial Networks," 2017 IEEE Conference on Computer Vision and Pattern Recognition (CVPR), Jul. 2017, 95-104.
Bousmalis et al., "Using Simulation and Domain Adaptation to Improve Efficiency of Deep Robotic Grasping," 2018 IEEE International Conference on Robotics and Automation (ICRA), May 2018, 4243-4250.
Brook et al., "Collaborative Grasp Planning with Multiple Object Representations," 2011 IEEE International Conference on Robotics and Automation, May 2011, 2851-2858.
Caseiro et al., "Beyond the shortest path: Unsupervised Domain Adaptation by Sampling Subspaces Along the Spline Flow," 2015 IEEE Conference on Computer Vision and Pattern Recognition (CVPR), Jun. 2015, 3846-3854.
Chang et al., "ShapeNet: An Information-Rich 3D Model Repository," https://arxiv.org/abs/1512.03012, Dec. 2015, 11 pages.
Chebotar et al., "Closing the Sim-to-Real Loop: Adapting Simulation Randomization with Real World Experience," https://arxiv.org/abs/1810.05687v3, Oct. 2018, 9 pages.
Chen et al., "Photographic Image Synthesis with Cascaded Refinement Networks," 2017 IEEE International Conference on Computer Vision (ICCV), Oct. 2017, 1520-1529.
Ciocarlie et al., "Towards Reliable Grasping and Manipulation in Household Environments," Experimental Robotics, 2014, 241-252.
Csurka, "Domain Adaptation for Visual Applications: A Comprehensive Survey," https://arxiv.org/abs/1702.05374v2, Mar. 2017, 46 pages.
Ganin et al., "Domain-Adversarial Training of Neural Networks," The Journal of Machine Learning Research, Apr. 2016, 35 pages.
Gong et al., "Geodesic Flow Kernel for Unsupervised Domain Adaptation," 2012 IEEE Conference on Computer Vision and Pattern Recognition, Jun. 2012, 2066-2073.
Goodfellow et al., "Generative Adversarial Nets," Advances in Neural Information Processing Systems, 2014, 9 pages.
Gopalan et al., "Domain Adaptation for Object Recognition: An Unsupervised Approach," 2011 International Conference on Computer Vision, Nov. 2011, 999-1006.
Gualtieri et al., "High precision grasp pose detection in dense clutter," 2016 IEEE/RSJ International Conference on Intelligent Robots and Systems (IROS), Oct. 2016, 598-605.
Hernandez et al., "Team Delft's Robot Winner of the Amazon Picking Challenge 2016," Robot World Cup, 2016, 613-624.
Hinterstoisser et al., "Multimodal Templates for Real-Time Detection of Texture-less Objects in Heavily Cluttered Scenes," 2011 International Conference on Computer Vision, Nov. 2011, 858-865.
Hoffman et al., CyCADA: Cycle-Consistent Adversarial Domain Adaptation, in Intl. Conference on Machine Learning, Jul. 2018, 10 pages.
Ioffe et al., "Batch Normalization: Accelerating Deep Network Training by Reducing Internal Covariate Shift," https://arxiv.org/abs/1502.03167v3, Mar. 2015, 11 pages.
Isola et al., "Image-to-Image Translation with Conditional Adversarial Networks," 2017 IEEE Conference on Computer Vision and Pattern Recognition (CVPR), Jul. 2017, 5967-5976.
James et al., "3D Simulation for Robot Arm Control with Deep Q-Learning," https://arxiv.org/abs/1609.03759v2, Dec. 2016, 6 pages.
James et al., "Task-Embedded Control Networks for Few-Shot Imitation Learning," https://arxiv.org/abs/1810.03237, Oct. 2018, 13 pages.
James et al., "Transferring End-to-End Visuomotor Control from Simulation to Real World for a Multi-Stage Task," https://arxiv.org/abs/1707.02267v2, Oct. 2017, 10 pages.
Kalashnikov et al., "QT-Opt: Scalable Deep Reinforcement Learning for Vision-Based Robotic Manipulation," https://arxiv.org/abs/1806.10293v3, Nov. 2018, 23 pages.
Kappler et al., "Leveraging Big Data for Grasp Planning," 2015 IEEE International Conference on Robotics and Automation (ICRA), May 2015, 4304-4311.
Kehoe et al., "Cloud-Based Robot Grasping with the Google Object Recognition Engine," 2013 IEEE International Conference on Robotics and Automation, May 2013, 4263-4270.
Kim et al., "Learning to Discover Cross-Domain Relations with Generative Adversarial Networks," Intl. Conference on Machine Learning, Aug. 2017, 9 pages.
Krizhevsky et al., "ImageNet Classification with Deep Convolutional Neural Networks," Advances in Neural Information Processing Systems, 2012, 9 pages.
Larsen et al., "Autoencoding beyond pixels using a learned similarity metric," Intl. Conference on Machine Learning, 2016, 9 pages.
Lenz et al., "Deep learning for detecting robotic grasps," The International Journal of Robotics Research, Mar. 2015, 34(4-5):705-724.
Levine et al., "Learning Hand-Eye Coordination for Robotic Grasping with Deep Learning and Large-Scale Data Collection," https://arxiv.org/abs/1603.02199v4, last revised Aug. 2016, 12 pages.
Lillicrap et al., "Continuous control with deep reinforcement learning," https://arxiv.org/abs/1509.02971v1, Sep. 2015, 14 pages.
Long et al., "Learning Transferable Features with Deep Adaptation Networks," https://arxiv.org/abs/1502.02791v1, Feb. 2015, 10 pages.
Mahler et al., "Dex-Net 2.0: Deep Learning to Plan Robust Grasps with Synthetic Point Clouds and Analytic Grasp Metrics," https://arxiv.org/abs/1703.09312v3, last revised Aug. 2017, 12 pages.
Matas et al., "Sim-to-Real Reinforcement Learning for Deformable Object Manipulation," https://arxiv.org/abs/1806.07851v2, last revised Oct. 2018, 10 pages.
Mnih et al., "Asynchronous Methods for Deep Reinforcement Learning," Intl. Conference on Machine Learning, Jun. 2016, 10 pages.
Mordatch et al., "Ensemble-CIO: Full-Body Dynamic Motion Planning that Transfers to Physical Humanoids," 2015 IEEE/RSJ International Conference on Intelligent Robots and Systems (IROS), Sep. 2015, 5307-5314.
Morrison et al., "Cartman: The Low-Cost Cartesian Manipulator that Won the Amazon Robotics Challenge," 2018 IEEE International Conference on Robotics and Automation (ICRA), May 2018, 7757-7764.
Patel et al., "Visual Domain Adaptation: A survey of recent advances," IEEE Signal Processing Magazine, May 2015, 32(3):53-69.
Peng et al., "Sim-to-Real Transfer of Robotic Control with Dynamics Randomization," https://arxiv.org/abs/1710.06537v3, last revised Mar. 2018, 8 pages.
Pinto et al., "Supersizing Self-supervision: Learning to Grasp from 50K Tries and 700 Robot Hours," 2016 IEEE International Conference on Robotics and Automation (ICRA), May 2016, 3406-3413.
Prattichizzo et al., "Grasping," Springer Handbook of Robotics, 2008, 671-700.
Rajeswaran et al., "EPOpt: Learning Robust Neural Network Policies Using Model Ensembles," https://arxiv.org/abs/1610.01283v4, last revised Mar. 2017, 15 pages.
Rodriguez et al., "From caging to grasping," The International Journal of Robotics Research, Apr. 2012, 16 pages.
Ronneberger et al., "U-Net: Convolutional Networks for Biomedical Image Segmentation," Intl. Conference on Medical Image Computing and Computer Assisted Intervention, 2015, 234-241.
Rusu et al., "Sim-to-Real Robot Learning from Pixels with Progressive Nets," Conference on Robot Learning, Oct. 2017, 9 pages.
Sadeghi et al., "CAD2RL: Real Single-Image Flight without a Single Real Image," https://arxiv.org/abs/1611.04201v4, last revised Jun. 2017, 12 pages.
Sadeghi et al., "Sim2Real Viewpoint Invariant Visual Servoing by Recurrent Control," 2018 IEEE/CVF Conference on Computer Vision and Pattern Recognition, Jun. 2018, 4691-4699.
Saxena et al., "Robotic Grasping of Novel Objects using Vision," The Intl. Journal of Robotics Research, Feb. 2008, 157-173.

(56) References Cited

OTHER PUBLICATIONS

Shrivastava et al., "Learning from Simulated and Unsupervised Images through Adversarial Training," 2017 IEEE Conference on Computer Vision and Pattern Recognition (CVPR), Jul. 2017, 2242-2251.
Shu et al., "A DIRT-T Approach to Unsupervised Domain Adaptation," https://arxiv.org/abs/1802.08735v2, last revised Mar. 2018, 19 pages.
Stein et al., "GeneSIS-RT: Generating Synthetic Images for Training Secondary Real-World Tasks," 2018 IEEE International Conference on Robotics and Automation (ICRA), May 2018, 7151-7158.
Sun et al., "Return of Frustratingly Easy Domain Adaptation," Association for the Advancement of Artificial Intelligence, Mar. 2016, 2058-2065.
Sunderhauf et al., "The limits and potentials of deep learning for robotics," The Intl. Journal of Robotics Research, Apr. 2018, 37(4-5):405-420.
Taigman et al., "Unsupervised Cross-Domain Image Generation," Intl. Conference on Learning Representations, retrieved from URL <https://pdfs.semanticscholar.org/b4ee/64022cc3ccd14c7f9d4935c59b16456067d3.pdf>, 2017, 6 pages.
Ten Pas et al., "Grasp Pose Detection in Point Clouds," The International Journal of Robotics Research, Oct. 2017, 36(13-14):19 pages.
Tobin et al., "Domain Randomization for Transferring Deep Neural Networks from Simulation to the Real World," 2017 IEEE/RSJ International Conference on Intelligent Robots and Systems (IROS), Sep. 2017, 23-30.
Tzeng et al., "Adapting Deep Visuomotor Representations with Weak Pairwise Constraints," https://arxiv.org/abs/1511.07111v5, last revised May 2017, 16 pages.
Ulyanov et al., "Instance Normalization: The Missing Ingredient for Fast Stylization," https://arxiv.org/abs/1607.08022v1, Jul. 2016, 6 pages.
Viereck et al., "Learning a visuomotor controller for real world robotic grasping using simulated depth images," Conference on Robot Learning, Oct. 2017, 10 pages.
Yi et al., "DualGAN: Unsupervised Dual Learning for Image-to-Image Translation," 2017 IEEE International Conference on Computer Vision (ICCV), Oct. 2017, 2868-2876.
Yoo et al., "Pixel-Level Domain Transfer," European Conference on Computer Vision, Mar. 2016, 517-532.
Yu et al., "Preparing for the Unknown: Learning a Universal Policy with Online System Identification," https://arxiv.org/abs/1702.02453v3, last revised May 2017, 10 pages.
Zeng et al., "Learning Synergies Between Pushing and Grasping with Self-Supervised Deep Reinforcement Learning," 2018 IEEE/RSJ International Conference on Intelligent Robots and Systems (IROS), Oct. 2018, 4238-4245.
Zhang et al., "VR-Goggles for Robots: Real-to-Sim Domain Adaptation for Visual Control," IEEE Robotics and Automation Letters, Apr. 2019, 1148-1155.
Zhu et al., "Unpaired Image-to-Image Translation using Cycle-Consistent Adversarial Networks," https://arxiv.org/abs/1703.10593v3, Nov. 2017, 20 pages.

* cited by examiner

DOMAIN ADAPTATION USING SIMULATION TO SIMULATION TRANSFER

CROSS-REFERENCE TO RELATED APPLICATION

This application claims the benefit under 35 U.S.C. § 119(a) of the filing date of Greek Patent Application No. 20180100527, filed in the Greek Patent Office on Nov. 23, 2018. The disclosure of the foregoing application is herein incorporated by reference in its entirety.

BACKGROUND

This specification relates to controlling robotic agents.

In some cases, a robotic agent interacts with an environment by performing actions that are selected by a system in response to receiving observations that characterize the current state of the environment.

Some systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a system that trains a generator neural network to process input images of scenes in a real-world environment to generate a respective adapted image for each input image. The respective adapted image for each input image is an image that appears to be an image of the same scene as in the input image but in a canonical simulation of the real-world environment. A simulation of a real-world environment is one or more computer programs that model the dynamics, semantics, and appearance of the real-world environment. A canonical simulation is a simulation that models the real-world environment, i.e., the dynamics, semantics and appearance, without any noise or randomization being inserted.

Once the generator neural network has been trained, the trained generator neural network can be used in controlling a robotic agent interacting with the real-world environment to cause the robotic agent to perform a robotic task.

The subject matter described in this specification can be implemented in particular embodiments so as to realize one or more of the following advantages.

The described systems train a generator neural network to adapt images from the real-world to simulation using training data that includes only or mostly simulated images, i.e., images from a canonical simulation and corresponding images from a randomized simulation. This is advantageous because images of the real-world can be unavailable or difficult to obtain while simulated images can be generated easily.

As a particular example, large amounts of simulated training data with accurate labels for robotic control can be generated relatively easily. Simulated training data is training data that is generated using a computer program simulation of a real-world environment. Real-world training data for robotic control, i.e., data gathered through actual interaction of the robotic agent with the real-world environment, on the other hand, is time-intensive and resource-intensive to collect, results in mechanical wear on the robotic agent, and can have noisy labels.

However, simulated training data is in practice difficult to employ in effectively training a control policy for use in controlling a real-world robotic agent interacting with the real-world environment. That is, directly using the simulation training data for training the control policy without accounting for the fact that the simulation training data is drawn from a different domain (simulation) than the intended domain (real-world) will generally result in the trained control policy performing poorly at controlling the real-world robot.

Some of the reasons for this poor performance can include that a specific simulation may not generalize well to an entire real-world environment and that the simulated data is systematically different from counterpart real-world data, e.g., because the real-world environment is less structured and predictable than the simulated environment, because images of the real-world environment appear differently from images of the simulated environment, and because dynamics of the real-world robotic agent can differ somewhat from the simulated version of the agent.

By training the generator neural network as described in this specification, the control policy can be effectively trained in simulation and then later used to control the real-world agent, i.e., by adapting the real-world images using the trained generator neural network. Being able to train the control policy in simulation greatly increases the amount of high-quality training data available for training the control policy. This results in improved performance of the trained network and of the robotic agent in performing the robotic task, even when the control policy is used to control the robotic agent using only monocular images of the environment captured by the sensors of the robot.

By using the generator neural network to adapt images, the need to generate large labeled datasets of real-world environment interactions is greatly reduced. Therefore, mechanical wear on the robotic agent during learning of the control policy is avoided. In fact, both the generator and the control policy can be trained using few or no real-world images.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a system that trains a generator neural network to process input images of scenes in a real-world environment to generate a respective adapted image for each input image. The respective adapted image for each input image is an image that appears to be an image of the same scene as in the input image but in a canonical simulation of the real-world environment. A simulation of a real-world environment is one or more computer programs that model the dynamics, semantics, and appearance of the real-world environment. A canonical simulation is a simulation that models the real-world environment, i.e., the dynamics, semantics and appearance, without any noise or randomization being inserted.

In particular, the system trains the generator to accurately adapt the real-world images even when no real-world images or only a small number of real-world images are available during the training.

Instead, the system trains the generator to adapt images of a randomized simulation of the real-world environment into images of the canonical simulation. The randomized simulation is one in which one or more characteristics of a scene simulated in the canonical simulation are randomly modified. As a result of the training, the generator neural network is able to accurately adapt real-world images into simulated images, even when no real-world images were used in the training.

Once the generator neural network has been trained, the trained generator neural network can be used in controlling a robotic agent interacting with the real-world environment to cause the robotic agent to perform a robotic task.

Figure 1:
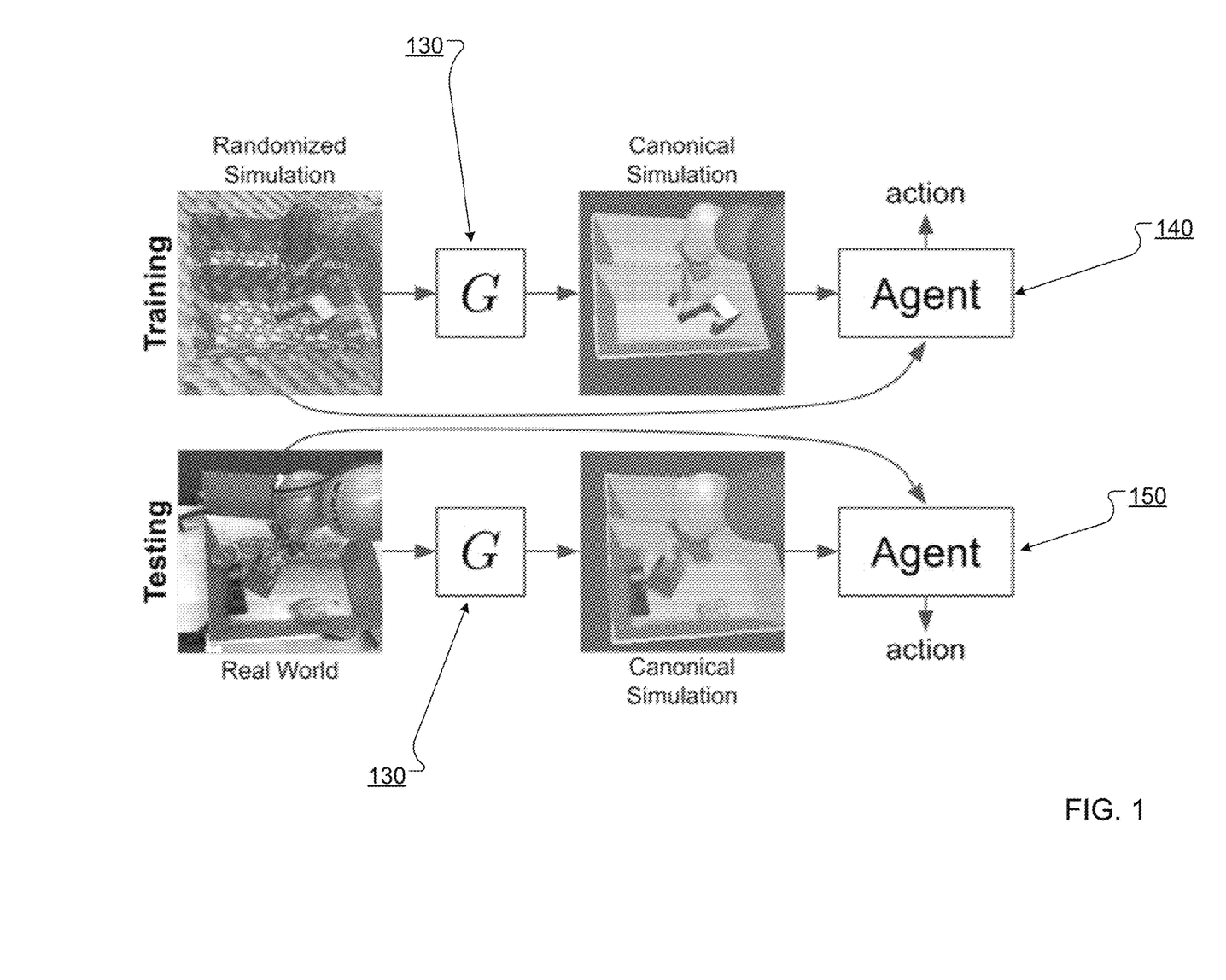
FIG. 1 shows how a generator neural network is used in controlling a robotic agent.

FIG. 1 shows how a generator neural network 130 is used to control a robotic agent 150 that interacts with a real-world environment.

The robotic agent 150 can be, e.g., a robotic arm or another, more complex robot that is controllable to change position within the environment.

In order for the agent 150 to interact with the real-world environment, a system receives one or more images characterizing the current state of the environment and selects an action to be performed by the agent using the received images using a control policy, e.g., a neural network or other trainable policy. In particular, the system attempts to select the actions so that the robotic agent can successfully perform a robotic task, e.g., an object grasping task, an object moving task, a navigation task, or another task that requires the agent 150 to interact with the real-world environment for some specific purpose.

As shown in FIG. 1, the system trains the control policy in simulation, i.e., while controlling a simulated version 140 of the agent 150 during training of the control policy. In particular, during this simulated training, the generator neural network 130 receives input images of a randomized simulation and adapts the images to images of a canonical simulation. The images of the canonical simulation can then be used to control the simulated version 140 of the real-world robotic agent 150 as the system learns the control policy.

During "testing" or during inference after training the control policy, the system controls the real-world agent 150 while the real-world agent interacts with the real-world environment.

In particular, in the real-world and after both the control policy and the generator neural network 130 have been trained, the system receives an input image of the real-word environment captured while the robotic agent is interacting with the real-world environment and processes the input image of the real-world environment using the trained generator neural network 130 to generate an adapted image from the input image, i.e., an image that appears to be from the canonical simulation.

The system then provides the adapted image as input to the control policy for the robotic agent to select the subsequent action to be performed by the robotic agent.

In some cases, as shown in the example of FIG. 1, the control policy is provided as input both the adapted image and the input image to generator neural network 130.

Thus, the control policy can be trained in simulation and, by making use of the generator neural network 130, can then be used to control the robotic agent in the real-world. That is, the control policy requires only adapted images generated by the generator neural network as input and does not directly receive as input any real-world images. In order to allow the generator neural network 130 to be suitable for this purpose despite limited or no real-world data being available for training, the system trains the generator 130 as described below.

In some cases, if real-world data is available, the control policy, the generator 130, or both can be fine-tuned on the real-world data after being trained in simulation. However, the generator 130 can be trained using the techniques described in this specification to accurately adapt real-world images even if very little or even no real-world data is available.

In particular, after training the generator neural network 130, the system can either use the generator neural network 130 directly in controlling the agent or provide data specifying the trained generator neural network 130, i.e., data identifying the architecture and trained parameter values of the neural network, to another system for use in adapting input images while controlling the robotic agent.

Figure 2:
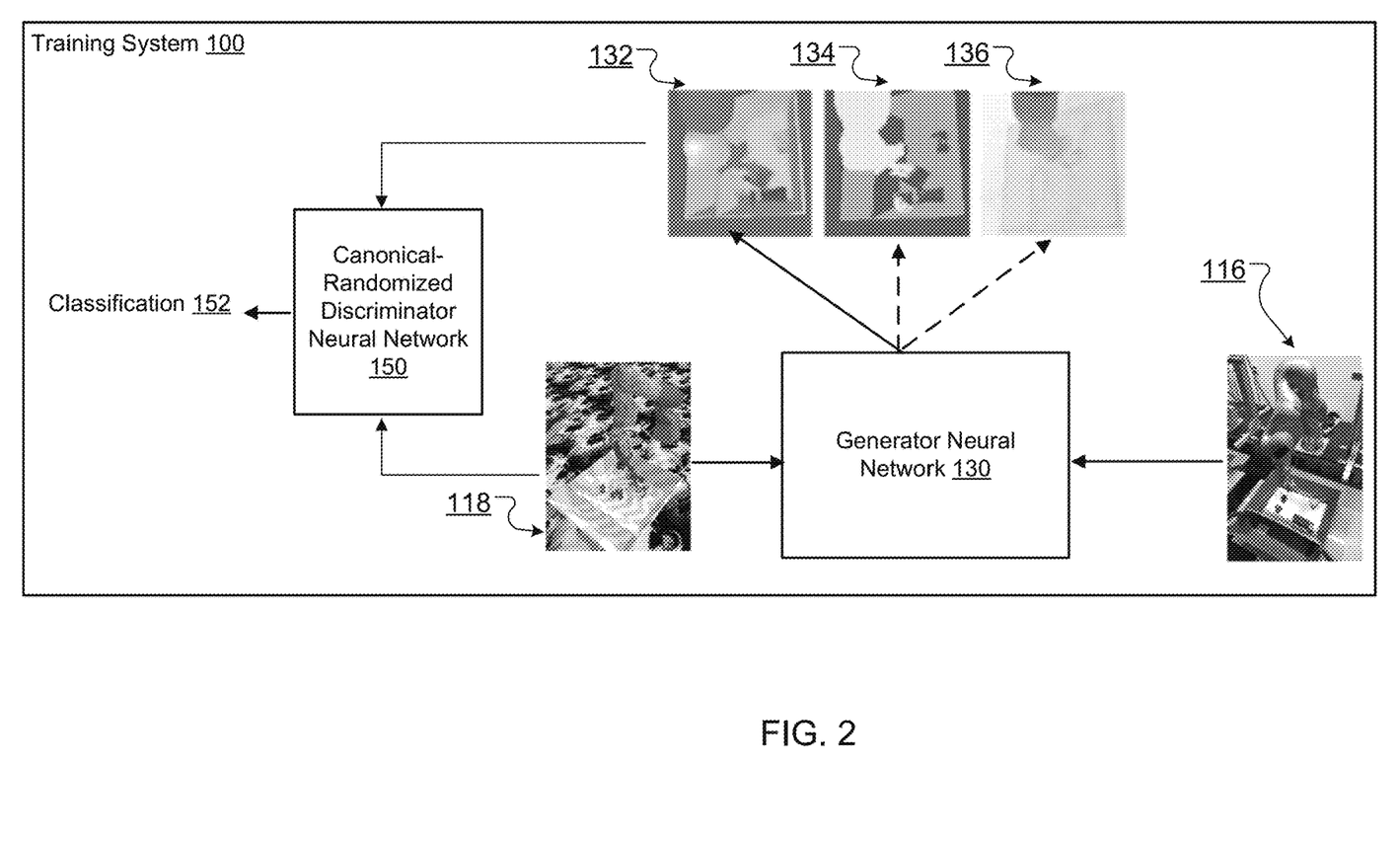
FIG. 2 shows an example neural network training system.

FIG. 2 shows an example neural network training system 100. The neural network training system 100 is an example of a system implemented as computer programs on one or more computers in one or more locations, in which the systems, components, and techniques described below are implemented.

As described above, the system 100 trains the generator neural network 130 to process input images of scenes in a real-world environment 116 to generate a respective adapted image 132 for each input image.

The respective adapted image 132 for each input image is an image that appears to be an image of the same scene as in the input image but in a canonical simulation of the real-world environment. A simulation of a real-world environment is one or more computer programs that model the dynamics, semantics, and appearance of the real-world environment. A canonical simulation is a simulation that models the real-world environment, i.e., the dynamics, semantics and appearance, without any noise or randomization being inserted.

For example, the canonical simulation can be one that standardizes the appearance of the environment, e.g., by applying uniform colors to the background and to objects in the environment while leaving the textures for the objects from the randomized version or the real-world in-place, by fixing the light sources in the environment, or both.

In particular, the system 100 trains the generator 130 to accurately adapt the real-world images even when no real-world images or only a small number of real-world images are available during the training.

Instead, the system 100 trains the generator 130 to adapt images 118 of a randomized simulation of the real-world environment into images of the canonical simulation. The randomized simulation is one in which one or more characteristics of a scene simulated in the canonical simulation are randomly modified. Randomizing images is described in more detail below with reference to FIG. 3.

As a result of the training, the trained generator neural network 130 is able to accurately adapt real-world images into simulated images, even when no real-world images were used in the training.

The generator neural network 130 can have any appropriate neural network architecture that allows the generator neural network 130 to map an input image to an output image. For example, the generator neural network 130 can be a fully-convolutional neural network that first contracts the spatial dimension of the input image through a series of contracting convolutions and then expands the spatial dimensions through a series of up-sampling convolution. An example of such a neural network architecture is the U-Net architecture, described in more detail in O. Ronneberger, P. Fischer, and T. Brox. U-net: Convolutional networks for biomedical image segmentation. In Intl. Conference on Medical Image Computing and Computer Assisted Intervention. Springer, 2015.

During the training, the system 100 repeatedly updates the values of the parameters of the generator neural network 130 ("generator parameters") to determine trained values of the generator parameters by optimizing an objective function that includes one or more terms that encourage adapted images generated by the generator neural network 130 by processing randomized simulated training images to be similar to the corresponding canonical simulated training images.

More specifically, the system 100 trains the generator neural network jointly with a canonical-randomized discriminator neural network 150. The canonical-randomized discriminator neural network 150 is a neural network having parameters ("canonical-randomized discriminator parameters") that is configured to process input images in accordance with the canonical-randomized discriminator parameters to classify each input image as either being a canonical simulated image or not, i.e., an adapted image or a randomized simulated image.

The discriminator 150 can have any appropriate neural network architecture that allows the neural network to map an input image to a classification, i.e., a score that indicates whether the input image is from the canonical simulation. For example, the discriminator 150 can be a convolutional neural network that has an output layer that has a single neuron that generates the classification.

Generally, the objective function used to train the generator 130 and the canonical-randomized discriminator 150 includes a first term that (i) penalizes the generator neural network for generating training adapted images that are accurately classified by the canonical-randomized discriminator neural network and (ii) encourages high classification accuracy of the canonical-randomized discriminator neural network on the canonical and randomized simulated training images.

By training the two neural networks 130 and 150 jointly on this objective function, the system 100 forces the generator 130 to continue to generate more accurate adapted images that cannot be properly classified by the canonical-randomized discriminator 150.

To improve the training of the generator 130, during training, the generator 130 can also be configured to make one or more auxiliary predictions for each input image that is processed by the generator 130.

One example of an auxiliary prediction that the generator 130 can be configured to make is to predict a segmentation mask 134 of an input image. That is, the generator 130 can be configured to process the input image to generate not only an adapted image 132 but also a predicted segmentation mask 134 of the input image. A segmentation mask of an input image assigns each pixel in the input image to one of a predetermined set of categories. For example, the categories can include different object categories and a background category that indicates that the pixel belongs to the background of the input image.

Another example of an auxiliary prediction that the generator 130 can be configured to make is to predict a depth map 136 of an input image. That is, the generator 130 can be configured to process the input image to generate not only an adapted image 132 but also a predicted depth map 136 of the input image and, further optionally, the predicted segmentation mask 134 of the input image. A depth map assigns a depth value to each pixel in the input image that represents the predicted distance of the scene that is depicted at that image from the camera that is capturing the input image.

Training the generator 130 and the discriminator 150 is described in more detail below with reference to FIG. 3.

Figure 3:
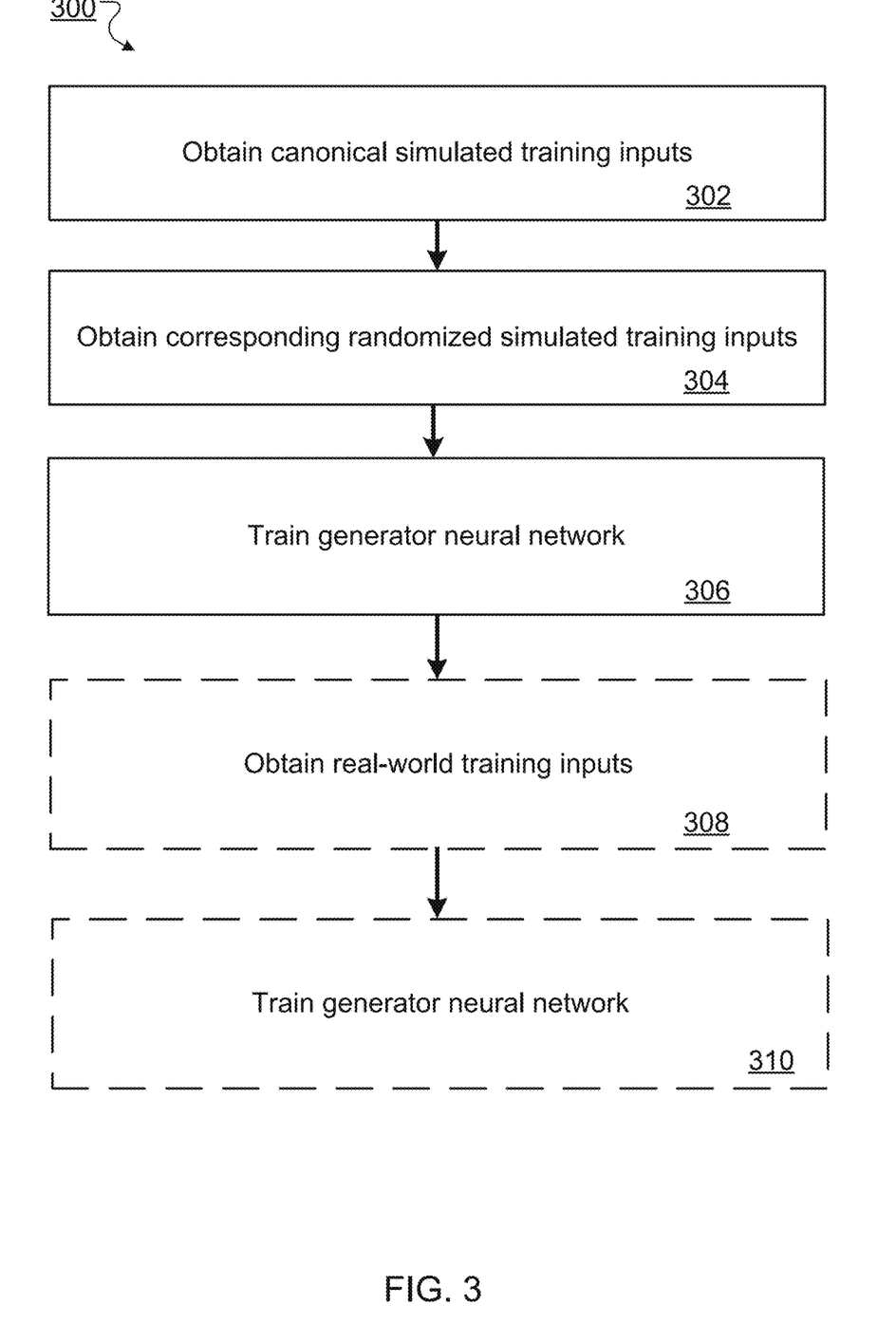
FIG. 3 is a flow chart of an example process for training the generator neural network.

FIG. 3 is a flow diagram of an example process 300 for training the generator neural network. For convenience, the process 300 will be described as being performed by a system of one or more computers located in one or more locations. For example, a neural network training system, e.g., the neural network training system 100 of FIG. 1, appropriately programmed, can perform the process 300.

The system obtains a plurality of canonical simulated training images and a corresponding randomized simulated training image for each canonical simulated training image (steps 302 and 304).

Each randomized training simulated image is generated by randomizing one or more characteristics of a scene depicted in the corresponding canonical simulated training image. In particular, the system can generate the canonical and corresponding randomized simulated images during interaction of the simulated agent with the simulated version of the environment, e.g., during simulated training of the control policy for the agent.

For example, during the interaction of the simulated agent with the simulated version of the environment, the system can periodically randomize one or more of: lighting characteristics of the scene, texture characteristics of the scene, or object properties of objects in the scene, e.g., position or size of the objects, to generate randomized simulated images. This can in include, in some cases, randomizing properties, e.g., size or position or color, of the simulated agent.

The system can also capture an image of the same scene but with the randomization removed to generate the corresponding canonical simulation images.

When the generator neural network makes one or more auxiliary predictions, the system also generates a respective ground truth prediction for each pair of simulated images, i.e., a ground truth segmentation mask, a ground truth depth map, or both. Because the images are being captured in simulation, the system is able to accurately generate the ground truth predictions without any external supervision, i.e., because the information required to generate the ground truth segmentation mask and the ground truth depth mask is already being used by the simulation to render the scene.

The system trains the generator neural network to optimize an objective function (step 306).

Generally the optimization function includes multiple terms, one or more of which encourage adapted images generated by the generator neural network by processing the randomized simulated training images to be similar to the corresponding canonical simulated training images. For example, the objective function can be a sum or a weighted sum of the multiple terms.

In particular, as described above, the system trains the generator jointly with a canonical-randomized discriminator. Given this, the objective function includes a first term that (i) penalizes the generator neural network for generating training adapted images that are accurately classified by the canonical-randomized discriminator neural network and (ii) encourages high classification accuracy of the canonical-randomized discriminator neural network on the canonical and randomized simulated training images.

For example, the discriminator can output the likelihood that a given input image is from the canonical domain, i.e., is from the canonical simulation rather than the randomized simulation, and the first term can be equal to the expectation of the logarithm of the likelihood generated by the discriminator for a randomized image plus the expectation of the logarithm of one minus the likelihood generated by the discriminator for an adapted image.

The objective function can also include another term that encourages visual similarity between the adapted training images generated by the generator neural network and the corresponding randomized simulated images. For example, this term can be a mean pairwise squared error (MPSE) or other error, e.g., L1 or L2 error, between an adapted training image generated by the generator neural network and the corresponding randomized simulation image.

In cases where the generator is also configured to make one or more auxiliary predictions, the objective function also includes additional terms that make use of the auxiliary predictions and the corresponding ground truth auxiliary predictions to improve the training of the generator.

For example, when the generator is also configured to generate a predicted depth map of each input image, the objective function also includes a term that encourages similarity between the predicted depth maps generated by the generator neural network and the corresponding ground truth depth maps. For example, this term can be an L2 distance or other error, e.g., L1 distance, between a predicted depth map generated by the generator neural network and the corresponding ground truth depth map.

As another example, when the generator neural network is further configured to generate a predicted segmentation mask of each input image, the objective function includes another term that encourages semantic similarity between the predicted segmentation masks generated by the generator neural network and the corresponding ground truth segmentation masks. For example, this term can be an L2 distance or other error, e.g., L1 distance, between a predicted segmentation mask generated by the generator neural network and the corresponding ground truth segmentation mask.

To train the generator neural network to optimize this objective function, the system can obtain batches of simulation training inputs that each include a set of canonical simulated images and their corresponding randomized simulation images. The system can then update the generator parameters using each batch of inputs by performing an iteration of a machine learning technique. In particular, the system determines a gradient of the objective function with respect to the generator parameters for each batch, e.g., through backpropagation, and then computes an update to the generator parameters using the gradient, e.g., by applying an optimizer, e.g., a stochastic gradient descent learning rule, the Adam optimizer, or rmsProp, to the gradient.

By repeatedly updating the generator parameters on batches of training data using this objective function, the system trains the generator neural network to accurately adapt input images to images of the canonical simulation of the environment.

Because the discriminator is being trained jointly with the generator, the system also needs to update the discriminator parameters during the training of the generator. Thus, as part of optimizing the objective function, the system repeatedly alternates between (i) performing an iteration of a machine learning training technique that updates the generator parameters to minimize the objective function by determining gradients with respect to the generator parameters for a batch of simulation training inputs (as described above) and (ii) performing an iteration of a machine learning training technique that adjusts the canonical-randomized discriminator parameters to maximize the objective function by determining gradients with respect to the canonical-randomized discriminator parameters for a batch of simulation training inputs. For example, the system can first perform (i) and then (ii) for each batch of simulation training inputs or first perform (ii) and then (i) for each batch of simulation training inputs.

Optionally, if any real-world images are available, the system can also obtain real-world training images of the real-world environment (step 308). For example, the system can receive or capture images of the real-world environment as the real-world agent interacts with the environment. During this interaction, the agent can be controlled by a different control policy, e.g., a random control policy that selects random actions or a fixed control policy that is not being trained.

If real-world images are available, the system also trains the generator neural network on the real-world images (step 310). For example, the system can fine-tune the generator neural network on the real-world images or include one or more additional terms in the objective function that encourage adapted images generated by the generator neural network by processing the real-world training images to appear to be images of the canonical simulation while maintaining the semantics of the corresponding real-world training images.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a generator neural network having a plurality of generator parameters to process input images of scenes in a real-world environment to generate a respective adapted image for each input image, wherein the respective adapted image for each input image appears to be an image of the same scene as in the input image but in a canonical simulation of the real-world environment, and wherein the method comprises:

obtaining a plurality of simulation training inputs, each simulation training input comprising (i) a canonical simulated training image of the canonical simulation of the real-world environment and (ii) a corresponding randomized simulated training image of a randomized simulation of the real-world environment generated by randomizing one or more characteristics of a scene depicted in the canonical simulated training image; and training the generator neural network on training data comprising the simulation training inputs to determine trained values of the generator parameters from initial values of the generator parameters, comprising:

optimizing an objective function that includes one or more terms that encourage adapted images generated by the generator neural network by processing the randomized simulated training images to be similar to the corresponding canonical simulated training images.

2. The method of claim 1, wherein:

training the generator neural network comprises training the generator neural network jointly with a canonical-randomized discriminator neural network having a plurality of canonical-randomized discriminator parameters, the canonical-randomized discriminator neural network is configured to process input images in accordance with the canonical-randomized discriminator parameters to classify each input image as either being an adapted image or a canonical simulated image, and the objective function includes a first term that (i) penalizes the generator neural network for generating training adapted images that are accurately classified by the canonical-randomized discriminator neural network and (ii) encourages high classification accuracy of the canonical-randomized discriminator neural network on the canonical and randomized simulated training images.

3. The method of claim 2, wherein training the generator neural network comprises repeatedly alternating between the following:

performing an iteration of a machine learning training technique that adjusts the generator parameters to minimize the first term by determining gradients with respect to the generator parameters for a batch of simulation training inputs; and performing an iteration of a machine learning training technique that adjusts the canonical-randomized discriminator parameters to maximize the first term by determining gradients with respect to the canonical-randomized discriminator parameters for a batch of simulation training inputs.

4. The method of claim 1, wherein the objective function includes a third term that encourages visual similarity between the adapted training images generated by the generator neural network and the corresponding randomized simulation images.

5. The method of claim 1, wherein each simulation training input further comprises a ground truth segmentation mask of the canonical simulated training image in the simulation training input, wherein the generator neural network is further configured to generate a predicted segmentation mask of each input image, and wherein the objective function includes a fourth term that encourages semantic similarity between the predicted segmentation masks generated by the generator neural network and the corresponding ground truth segmentation masks.

6. The method of claim 1,
wherein each simulation training input further comprises a ground truth depth map of the canonical simulated training image in the simulation training input,
wherein the generator neural network is further configured to generate a predicted depth map of each input image, and
wherein the objective function includes a fifth term that encourages similarity between the predicted depth maps generated by the generator neural network and the corresponding ground truth depth maps.

7. The method of claim 1, further comprising:
obtaining a plurality of real-world training images, each real-world training image being an image of the real-world environment, wherein:
the training data further comprises the plurality of real-world training images, and
the objective function includes one or more terms that encourage adapted images generated by the generator neural network by processing the real-world training images to appear to be images of the canonical simulation while maintaining the semantics of the corresponding real-world training images.

8. The method of claim 1, wherein the canonical training images are images captured while a simulated version of a robotic agent interacts with a simulated version of the real-world environment.

9. The method of claim 8, wherein the canonical training images are captured during the training of a control policy for the robotic agent in the simulated version of the real-world environment.

10. The method of claim 1, further comprising, after the generator neural network is trained, using the trained generator neural network in controlling the robotic agent interacting with the real-world environment to cause the robotic agent to perform a robotic task, comprising:
receiving an input image of the real-word environment captured while the robotic agent is interacting with the real-world environment;
processing the input image of the real-world environment using the trained generator neural network to generate an adapted image from the input image; and
providing the adapted image as input to a control policy for the robotic agent to select a subsequent action to be performed by the robotic agent.

11. The method of claim 10, wherein the control policy for the robotic agent is trained to control the robotic agent at least in part in a simulated version of the real-world environment.

12. The method of claim 11, wherein obtaining a plurality of simulation training inputs comprises:
capturing the canonical simulated training images in the plurality of simulation training inputs during the training of the control policy in the simulated version of the environment.

13. The method of claim 1, wherein randomizing one or more characteristics of a scene depicted in the canonical simulated training image comprises randomizing one or more of:
lighting characteristics of the scene, texture characteristics of the scene, or object properties of objects in the scene.

14. A system comprising one or more computers and one or more storage devices storing instructions that when executed by the one or more computers cause the one or more computers to perform operations training a generator neural network having a plurality of generator parameters to process input images of scenes in a real-world environment to generate a respective adapted image for each input image, wherein the respective adapted image for each input image appears to be an image of the same scene as in the input image but in a canonical simulation of the real-world environment, and wherein the operations comprise:
obtaining a plurality of simulation training inputs, each simulation training input comprising (i) a canonical simulated training image of the canonical simulation of the real-world environment and (ii) a corresponding randomized simulated training image of a randomized simulation of the real-world environment generated by randomizing one or more characteristics of a scene depicted in the canonical simulated training image; and
training the generator neural network on training data comprising the simulation training inputs to determine trained values of the generator parameters from initial values of the generator parameters, comprising:
optimizing an objective function that includes one or more terms that encourage adapted images generated by the generator neural network by processing the randomized simulated training images to be similar to the corresponding canonical simulated training images.

15. The system of claim 14, wherein: training the generator neural network comprises training the generator neural network jointly with a canonical-randomized discriminator neural network having a plurality of canonical-randomized discriminator parameters, the canonical-randomized discriminator neural network is configured to process input images in accordance with the canonical-randomized discriminator parameters to classify each input image as either being an adapted image or a canonical simulated image, and the objective function includes a first term that (i) penalizes the generator neural network for generating training adapted images that are accurately classified by the canonical-randomized discriminator neural network and (ii) encourages high classification accuracy of the canonical-randomized discriminator neural network on the canonical and randomized simulated training images.

16. The system of claim 15, wherein training the generator neural network comprises repeatedly alternating between the following:
performing an iteration of a machine learning training technique that adjusts the generator parameters to minimize the first term by determining gradients with respect to the generator parameters for a batch of simulation training inputs; and
performing an iteration of a machine learning training technique that adjusts the canonical-randomized discriminator parameters to maximize the first term by determining gradients with respect to the canonical-randomized discriminator parameters for a batch of simulation training inputs.

17. The system of claim 14, wherein the objective function includes a third term that encourages visual similarity between the adapted training images generated by the generator neural network and the corresponding randomized simulation images.

18. The system of claim 14,
wherein each simulation training input further comprises a ground truth segmentation mask of the canonical simulated training image in the simulation training input,
wherein the generator neural network is further configured to generate a predicted segmentation mask of each input image, and wherein the objective function includes a fourth term that encourages semantic similarity between the predicted segmentation masks generated by the generator neural network and the corresponding ground truth segmentation masks.

19. The system of claim 14, wherein each simulation training input further comprises a ground truth depth map of the canonical simulated training image in the simulation training input, wherein the generator neural network is further configured to generate a predicted depth map of each input image, and wherein the objective function includes a fifth term that encourages similarity between the predicted depth maps generated by the generator neural network and the corresponding ground truth depth maps.

20. One or more non-transitory computer-readable storage media storing instructions that when executed by one or more computers cause the one or more computers to perform operations comprising:

training a generator neural network having a plurality of generator parameters to process input images of scenes in a real-world environment to generate a respective adapted image for each input image, wherein the respective adapted image for each input image appears to be an image of the same scene as in the input image but in a canonical simulation of the real-world environment, and wherein the operations comprise:

obtaining a plurality of simulation training inputs, each simulation training input comprising (i) a canonical simulated training image of the canonical simulation of the real-world environment and (ii) a corresponding randomized simulated training image of a randomized simulation of the real-world environment generated by randomizing one or more characteristics of a scene depicted in the canonical simulated training image; and training the generator neural network on training data comprising the simulation training inputs to determine trained values of the generator parameters from initial values of the generator parameters, comprising:

optimizing an objective function that includes one or more terms that encourage adapted images generated by the generator neural network by processing the randomized simulated training images to be similar to the corresponding canonical simulated training images.

\* \* \* \* \*